United States Patent Office 3,372,998
Patented Mar. 12, 1968

3,372,998
REPROCESSING OF SPENT URANIUM FUEL BY MEANS OF CHLORINATION AND FRACTIONAL ABSORPTION BY BARIUM CHLORIDE
Takehiko Ishihara and Kenmei Hirano, Mito-shi, Ibaraki-ken, and Takeshi Soga, Naka-gun, Ibaraki-ken, Japan, assignors to Japan Atomic Energy Research Institute, Tokyo, Japan
No Drawing. Filed Mar. 4, 1966, Ser. No. 531,773
Claims priority, application Japan, Mar. 18, 1965, 40/15,390
10 Claims. (Cl. 23—326)

ABSTRACT OF THE DISCLOSURE

Spent uranium fuel from an atomic reactor is converted at about 600° C. by reaction with a chlorine-bearing carbon compound free from hydrogen into gaseous chlorides of uranium, mainly the tetrachloride, and of the fission products. Uranium tetrachloride is preferentially absorbed from the chloride mixture on barium chloride with which it forms a stable compound below 583° C. The compound is decomposed by chlorine to volatile uranium hexachloride. The latter decomposes spontaneously to the tetrachloride which may be recycled for further purification.

---

This invention relates to the reprocessing of spent nuclear fuel and particularly to a process for separating fission products from a spent uranium fuel.

Extraction of the spent fuel with organic solvents is the only reprocessing method now in practical use. This method has a very high decontamination factor, but the spent fuel must be stored or "cooled" prior to reprocessing for about 100 days until its radioactivity decreases substantially to avoid decomposition of the organic solvent by radiation. According to another known method, the spent fuel is fluorinated and the vapors of the fluorides obtained are passed through a bed of solid sodium fluoride at 100° C., whereby uranium hexafluoride is selectively absorbed by the salt. When the salt bed is heated to 400–500° C., uranium fluoride is selectively desorbed from the salt. By repeating the absorption and desorption cycle a decontamination factor of $1 \times 10^6$ is reached. However, fluorine and the vapors of fluorides are highly corrosive, making it extremely difficult to construct an industrial reprocessing plant.

The fractional distillation of chlorides obtained by chlorinating spent uranium fuel has been studied. But the decontamination factor of the known fractionation methods is too low.

The object of this invention is a more efficient method for fractionating chlorinated spent uranium fuel.

According to this invention, spent uranium fuel is reacted with a chlorinating agent that is a carbon compound having no hydrogen in its molecule to form a mixture of uranium chlorides, mainly uranium tetrachloride, and chlorides of accompanying fission products. The mixed chloride vapors are passed through a bed of solid barium chloride, in which uranium is absorbed. The fission products, whose vapor pressures are high, pass through the bed. The absorbed uranium tetrachloride is further chlorinated by passing chlorine gas through said bed, whereby gaseous uranium hexachloride is released.

The spent uranium may be in the form of metallic uranium or of uranium compounds (oxide, carbide) suitable primary chlorinating agents are carbon tetrachloride, phosgene, hexachloroethane or tetrachloroethylene, and are employed at 450–700° C., preferably at about 600° C.

During primary chlorination, uranium in the fuel material is mainly converted to uranium tetrachloride. A small amount of pentachloride and hexachloride may also be produced. The fission products form chlorides most of which are volatile.

When the vapor mixture of chlorides which is substantially free of chlorine gas passes through a bed of barium chloride granules which is kept at 250–580° C., uranium tetrachloride is believed to react with barium chloride to form a compound $Ba_2UCl_8$, which is stable at temperatures below 583° C. Uranium pentachloride and hexachloride in the gaseous mixture are unstable in the absence of a substantial amount of chlorine and are converted to tetrachloride while passing through the barium chloride bed. Depending upon the temperature of the barium chloride bed, chlorides of the rare earths, of zirconium and columbium may also be absorbed by the barium chloride.

After the mixture is absorbed, the bed is kept at a temperature between 350° C. and 580° C. (higher temperatures are desirable in this stage) while a gas free from chlorine is being passed in a continuous stream to remove chlorides of the fission products.

Then the bed is heated to a temperature between 400° C. and 700° C. while chlorine or a mixture of chlorine and an inert gas is being passed through the bed in a continuous stream. The uranium tetrachloride is converted to hexachloride and removed from the bed. The vapor pressure of $UCl_6$ is 1 atm. at 280° C. At a temperature higher than 700° C., chlorides of the fission products absorbed in the bed are volatilized. Therefore, the desorption should be carried out at a temperature lower than 700° C.

The uranium hexachloride may be reduced to tetrachloride in a chlorine-free atmosphere and absorbed in another barium chloride column for repetition of the separation treatment. Very pure uranium can be recovered.

Example

Uranium dioxide fuel pellets, which had been irradiated with a total neutron flux of $1 \times 10^{16}$ n./cm.$^2$, and then had been cooled for 50 days, were pulverized by alternating oxidation with air and reduction with hydrogen at elevated temperature.

One gram of the impure uranium dioxide powder obtained was heated to 600° C. in a quartz tube of 25 mm. diameter and 20 cm. length, and a mixture of carbon tetrachloride vapor and argon (40:60 by volume) was passed through said tube. The mixed chloride vapor thus produced was passed through a quartz column of 20 mm. diameter and 20 cm. length packed with barium chloride granules (4 mm. in diameter) heated to 350° C.

The barium chloride tube was then cooled to room temperature so as to strengthen the chemical bond between the uranium tetrachloride and the barium chloride. It was again heated to 500° C. while a mixture of carbon tetrachloride vapor and argon (20:80 by volume) was passed therethrough for 30 minutes, whereby the volatile chlorides of the fission products were removed as much as possible.

Then a mixture of carbon tetrachloride and chlorine (85:15 by volume) was passed through the barium chloride bed at 500° C., whereby the absorbed uranium tetrachloride was oxidized to uranium hexachloride, which was vaporized and deposited on a cool tube connected to the barium chloride tube. The hexachloride was reduced to the tetrachloride by standing in a chlorine-free atmosphere, and the uranium tetrachloride was collected and weighed. Recovery of uranium was 99%. A small amount of the collected uranium tetrachloride was used for gamma ray spectrography. The decontamination factor with respect to gamma radiation was 95.

One half gram of the collected tetrachloride was heated to 400° C. in the 40:60 mixture of carbon tetrachloride vapor and argon, and the vapor was absorbed on barium chloride in a tube preheated to 400° C. and kept at 500° C. for 30 minutes while the gas mixture passed through the tube. Then the tube was kept at 500° C. and the mixture of carbon tetrachloride and chlorine was passed and uranium hexachloride was recovered. Recovery was 99% of the recycled material or 98% of the initial amount, and the decontamination factor was $3.6 \times 10^3$.

It was also found that the temperature of the absorption tube packed with barium chloride should vary in the direction of gas flow, the inlet end being heated to 500° C. and the temperature of the tube gradually decreasing to 150° C. at the outlet end. This permits uranium pentachloride and hexachloride to be reduced to the tetrachloride while they pass through the absorption tube. Graded heating of the absorption tube was therefore employed in the experiments whose results are summarized in Table 0.

All experiments were carried out as described in the first half of the above example. The uranium fuel materials used in these experiments had been irradiated and the $UO_2$ samples were pulverized by the above-mentioned oxidation and reduction cycle. Metallic uranium and $UC_2$ were directly chlorinated.

In Experiment I, the effect of varying proportions of $CCl_4$ in the chlorinating gas mixture was checked.

TABLE I

|  | 1 | 2 | 3 |
|---|---|---|---|
| Gas Composition (vol. percent) | 40 $CCl_4$-60 Ar | 30 $CCl_4$-70 Ar | 20 $CCl_4$-80 Ar |
| Gas Flow Rate (cm./min., 25° C.) | 32 | 30 | 28 |
| Absorption Time (min.) | 35 | 45 | 60 |
| Recovery of Uranium (percent) | 99.6 | 98.6 | 99.0 |
| Decontamination Factor | 85 | 93 | 78 |

The concentration of $CCl_4$ in the gas mixture has no substantial influence upon the chlorination of the spent uranium fuel. Even 100% $CCl_4$ can be used. However, when the concentration is more than 50 vol. percent, $CCl_4$ is promoted and deposition of carbon is deposited in the reaction tube. In all later experiments, a mixture of 40 $CCl_4$–60 Ar was therefore employed. Gas mixtures used for oxidation and desorption of the absorbed uranium tetrachloride mostly contained argon as a carrier gas.

In Experiment II, only argon was used for desorbing chlorides of the fission product, and conditions were otherwise the same as in Experiment I. The results were unsatisfactory.

TABLE 0

| Experimental Conditions | Experiment | | | | | | |
|---|---|---|---|---|---|---|---|
| | I | II | III | IV | V | VI | VII |
| Sample: | | | | | | | |
| Compound | $UO_2$ | $UO_2$ | $UO_2$ | $UO_2$ | $UO_2$ | $UO_2$ | $UO_2$ |
| Irradiation Dose (n./cm.²) | $2 \times 10^{15}$ | $2 \times 10^{15}$ | $1 \times 10^{16}$ | $2 \times 10^{16}$ | $2 \times 10^{15}$ | $2 \times 10^{15}$ | $2 \times 10^{15}$ |
| No. of Cooling Days | 40 | 60 | 50 | 50 | 60 | 55 | 50 |
| Amount Used (g.) | 0.5 | 0.5 | 1.0 | 0.5 | 0.5 | 0.5 | 0.5 |
| Chlorination and Absorption: | | | | | | | |
| Gas Composition (vol. percent) | Table I | 40 $CCl_4$ 60 Ar | 40 $CCl_4$ 60 Ar | 40 $CCl_4$ 60 Ar | 40 $CCl_4$ 60 Ar | 40 $CCl_4$ 60 Ar | 40 $CCl_4$ 60 $N_2$ |
| Gas Flow Rate (cm./min. 25° C.) | do | 32 | 32 | 32 | 32 | 44 | 32 |
| Amount of Absorbent (g.) | 22 | 22 | 30 | 30 | 22 | 22 | 22 |
| Chlorination Temperature (° C.) | 600 | 600 | Table III | 600 | 600 | 600 | 600 |
| Absorption Temperature (° C.) | 500–150 | 500–150 | 450–400 | 500–150 | 500–150 | 450–350 | 500–150 |
| Absorption Time (min.) | Table I | 35 | Table III | 35 | 35 | 35 | 40 |
| Selective Desorption of Fission Product Chlorides: | | | | | | | |
| Gas Composition (vol. percent) | 10 $CCl_4$ 90 Ar | 100 Ar | 20 $CCl_4$ 80 Ar | 10 $CCl_4$ 90 Ar | 5 $CCl_4$ 95 $H_2$ | 5 $CCl_4$ 95 Ar | 10 $CCl_4$ 90 $N_2$ |
| Gas Flow Rate (cm./min. 25° C.) | 32 | 29 | 40 | 40 | 45 | 40 | 32 |
| Temperature (° C.) | 480 | 480 | 450 | 450 | Table V | 480 | 490 |
| Time (min.) | 60 | 60 | 60 | 30 | 60 | 60 | 60 |
| Selective Desorption of Uranium Hexachloride: | | | | | | | |
| Gas Composition (vol. percent) | 70 $Cl_2$ 15 $CCl_4$ 15 Ar | 70 $Cl_2$ 15 $CCl_4$ 15 Ar | 90 $Cl_2$ 10 $CCl_4$ | Table IV | 100 $Cl_2$ | 90 $Cl_2$ 10 $CCl_4$ | 80 $Cl_2$ 20 $CCl_4$ |
| Gas Flow Rate (cm./min. 25° C.) | 96 | 96 | 80 | do | 70 | 96 | 80 |
| Temperature (° C.) | 540 | 540 | 560 | 530 | 540 | Table VI | 540 |
| Time (min.) | 90 | 90 | 90 | 90 | 90 | 90 | 90 |
| Recovery of Uranium (percent) | Table I | 97.0 | Table III | Table IV | Table V | Table VI | 99.0 |
| Decontamination Factor (Gamma Radioactivity) | Table II | 65 | do | do | do | do | 110 |

| Experimental Conditions | Experiment | | | | | | |
|---|---|---|---|---|---|---|---|
| | VIII | IX | X | XI | XII | XIII | XIV |
| Sample: | | | | | | | |
| Compound | $UO_2$ | $U_3O_8$ | $UO_2$ | $UO_2$ | U | $UC_2$ | $UC_2$ |
| Irradiation Dose (n./cm.²) | $2 \times 10^{15}$ | $1 \times 10^{18}$ | $2 \times 10^{15}$ | $2 \times 10^{15}$ | $2 \times 10^{15}$ | $1 \times 10^{16}$ | $1 \times 10^{16}$ |
| No. of Cooling Days | 50 | 200 | 32 | 40 | 50 | 60 | 85 |
| Amount Used (g.) | 0.5 | 0.5 | 0.5 | 0.5 | 1.0 | 1.0 | 1.0 |
| Chlorination and Absorption: | | | | | | | |
| Gas Composition (vol. percent) | 40 $CCl_4$ 60 $N_2$ | 40 $CCl_4$ 60 Ar | 30 $COCl_2$ 70 Ar | 30 $C_2Cl_6$ 70 Ar | 40 $CCl_4$ 60 Ar | 40 $CCl_4$ 60 Ar | 40 $COCl_2$ 60 $N_2$ |
| Gas Flow Rate (cm./min. 25° C.) | 32 | 32 | 30 | 30 | 32 | 32 | 30 |
| Amount of Absorbent (g.) | 22 | 22 | 22 | 22 | 22 | 30 | 22 |
| Chlorination Temperature (° C.) | 600 | 600 | 580 | 580 | 550 | 580 | 580 |
| Absorption Temperature (° C.) | 500–150 | 500–150 | 500–300 | 500–300 | 500–150 | 400 | 500–150 |
| Absorption Time (min.) | 40 | 40 | 40 | 40 | 30 | 60 | 60 |
| Selective Desorption of Fission Product Chlorides: | | | | | | | |
| Gas Composition (vol. percent) | 100 $N_2$ | 10 $CCl_4$ 90 $H_2$ | 5 $CCl_2$ 95 Ar | 5 $C_2Cl_6$ 95 Ar | 10 $CCl_4$ 90 Ar | 40 $CCl_4$ 60 Ar | 100 $N_2$ |
| Gas Flow Rate (cm./min. 25° C.) | 29 | 32 | 40 | 40 | 40 | 32 | 30 |
| Temperature (° C.) | 490 | 520 | 470 | 460 | 470 | 500 | 480 |
| Time (min.) | 60 | 60 | 60 | 60 | 60 | 30 | 30 |
| Selective Desorption of Uranium Hexachloride: | | | | | | | |
| Gas Composition (vol. percent) | 80 $Cl_2$ 20 $CCl_4$ | 70 $Cl_2$ 15 $CCl_4$ | 100 $Cl_2$ | 100 $Cl_2$ | 90 $Cl_2$ 10 $CCl_4$ | 100 $Cl_2$ | 80 $Cl_2$ 20 $N_2$ |
| Gas Flow Rate (cm./min. 25° C.) | 80 | 96 | 50 | 80 | 80 | 50 | 60 |
| Temperature (° C.) | 540 | 550 | 540 | 540 | 540 | 550 | 550 |
| Time (min.) | 90 | 90 | 90 | 90 | 90 | 90 | 90 |
| Recovery of Uranium (percent) | 97.3 | 99.9 | 98.3 | 99.1 | 99.3 | 99.2 | 97.8 |
| Decontamination Factor (Gamma Radioactivity) | 88 | $2.0 \times 10^3$ | 68 | 78 | 93 | 140 | 100 |

In Experiment III, the chlorination temperature was varied. The results are shown in Table III.

TABLE III

|  | 1 | 2 | 3 | 4 |
|---|---|---|---|---|
| Chlorination Temperature (° C.) | 450 | 500 | 600 | 700 |
| Absorption Time (min.) | 360 | 180 | 60 | 45 |
| Recovery of Uranium (percent) | 94.7 | 98.2 | 99.4 | 99.0 |
| Decontamination Factor | $2.1 \times 10$ | $1.2 \times 10$ | $1.3 \times 10$ | 72 |

The preferred temperature is about 600° C. and was used in the following experiments.

In Experiment IV, the $CCl_4$ concentration in the gas mixture used for desorption of $UCl_6$ was varied. The results are shown in Table IV and are most favorable with 90 $Cl_2$–10 $CCl_4$.

TABLE IV

|  | 1 | 2 | 3 |
|---|---|---|---|
| Composition of Desorbing Gas (vol. percent) | 80 $Cl_2$-20 $CCl_4$ | 90 $Cl_2$-10 $CCl_4$ | 100 $Cl_2$ |
| Recovery of Uranium (percent) | 99.0 | 99.2 | 98.1 |
| Decontamination Factor | $1.3 \times 10^2$ | $1.5 \times 10^2$ | 95 |

In Experiment V, the temperature for desorbing fission product chlorides was varied, and hydrogen was used as a diluent for $CCl_4$ in the desorbing gas mixture. The results are shown in Table V, and indicate

TABLE V

|  | 1 | 2 | 3 | 4 | 5 | 6 |
|---|---|---|---|---|---|---|
| Fission Products Desorption Temperature (° C.) | 350 | 400 | 450 | 500 | 550 | 580 |
| Recovery of Uranium (percent) | 97.5 | 96.2 | 98.8 | 98.0 | 98.7 | 93.2 |
| Decontamination Factor | 45 | 53 | 82.1 | $1.1 \times 10^2$ | 97 | 90 | that a high temperature, but below 583° C. (the decomposition temperature of $Ba_2UCl_8$) is most favorable.

It was found that hydrogen can be used in this stage. In the first chlorination step, hydrogen-containing compounds or elementary hydrogen in the reaction zone are objectionable, because they may form water.

In Experiment VI, the desorption temperature of $UCl_6$ was varied. The results are shown in Table VI, and indicate that the most favorable temperature range is 500–550° C.

TABLE VI

|  | 1 | 2 | 3 | 4 | 5 | 6 | 7 | 8 |
|---|---|---|---|---|---|---|---|---|
| Desorption Temperature of $UCl_6$ (° C.) | 400 | 500 | 530 | 540 | 550 | 580 | 600 | 700 |
| Recovery of Uranium (percent) | 45.0 | 96.7 | 99.2 | 99.8 | 98.7 | 91.0 | 78.5 | 58.7 |
| Decontamination | $1.7 \times 10^2$ | 92 | 85 | 88 | 79 | 67 | 42 | 25 |

In Experiment VII, nitrogen was tested successfully as a diluent for $CCl_4$ in the chlorination of fuel material and in the desorption of fission products.

Experiment VIII differs from Experiment VII, in that only nitrogen was used for desorbing fission product chlorides. As shown in Table 0, 100% nitrogen can be used though not with best results.

Experiment IX was carried out with $U_3O_8$ obtained by stopping the oxidation-reduction cycle of the Example after the oxidation stage. In this experiment, hydrogen was used as a diluent for $CCl_4$ in the desorption of the fission products. The results were excellent.

In Experiment X, phosgene was used as a chlorinating agent though not with completely satisfactory results.

In Experiment XI, hexachloroethane was used successfully as a chlorinating agent.

In Experiment XII, metallic uranium was used as the starting material. A one gram pellet of metallic uranium was directly chlorinated without any pretreatment.

In Experiment XIII, uranium dicarbide was used successfully as the starting material for the process.

In Experiment XIV, the procedure of Experiment XIII was repeated with phosgene as a chlorinating agent and nitrogen as a diluent. The results were satisfactory.

In further experiments, the following compounds as chlorinating agents were tested.

$CCl_2:CCl_2$ Tetrachloroethylene
$C_6Cl_6$ Hexachlorobenzene
CNCl Cyanogen chloride
$C_6OCl_6$ Hexachlorophenol
$O:C_6Cl_4:O$ Tetrachloroquinone
Cl $CO_2$ $CCl_3$ Trichloromethyl chloroformate (Diphosgene)

$C_3N_3Cl_3$ Tricyanogen chloride
$CCl_2:CCl\text{-}CCl:CCl_2$ Hexachloro-1,3-butadiene The color of the reaction product in the chlorination tube indicated that all these compounds form uranium tetrachloride and are applicable to this process, though the yields have not yet been determined.

The method of this invention has the following advantages:

(1) By repeated absorption and desorption of uranium chloride in a barium chloride bed, uranium can be recovered with a high decantamination factor.

(2) The operation is anhydrous so that there is no corrosion problem.

(3) The fission products are recovered in the solid state, as a non-volatile residue absorbed in the barium chloride bed or as a non-volatile residue condensed after being desorbed from the barium chloride without further treatment.

(4) Uranium can be recovered with a yield of 99% by weight.

(5) The vapor pressure of barium chloride is so low ($1 \times 10^{-4}$ atm. at 1000° C., B.P. 1560° C.) and its melting point is so high (960° C.) that the recovered uranium cannot be contaminated with vaporized barium chloride.

What we claim is:

1. A method of reprocessing spent nuclear fuel essentially consisting of a material selected from the group consisting of uranium metal, uranium oxide, and uranium carbide, and of contaminating fission products of said material, which comprises:
   (a) reacting said fuel with a chlorine-bearing carbon compound free from hydrogen at 450 to 700° C. until said material is substantially converted to uranium tetrachloride vapor and said fission products are converted to vapors of the respective chlorides;
   (b) contacting said vapors with solid barium chloride at a temperature not substantially lower than 150° C. and lower than 583° C., whereby said uranium tetrachloride and a portion of the chlorides of said fission products are absorbed by said barium chloride;
   (c) contacting said barium chloride while having said uranium tetrachloride absorbed therein with elementary chlorine at a temperature substantially between 400° and 700° C. until uranium hexachloride as a vapor is discharged from said barium chloride; and
   (d) collecting said uranium hexachloride.

2. A method as set forth in claim 1, wherein said carbon compound consists of carbon and chlorine.

3. A method as set forth in claim 1, wherein said carbon compound consists of carbon, chlorine, and oxygen.

4. A method as set forth in claim 1, wherein said carbon compound consists of chlorine, carbon, and nitrogen.

5. A method as set forth in claim 1, wherein said carbon compound is carbon tetrachloride.

6. A method as set forth in claim 1, wherein said carbon compound is hexachloroethane, tetrachloroethylene, or hexachloro-1,3-butadiene.

7. A method as set forth in claim 1, wherein said carbon compound is phosgene.

8. A method as set forth in claim 1, wherein said carbon compound is gaseous and diluted with argon.

9. A method as set forth in claim 1, wherein a gaseous mixture of carbon tetrachloride and an inert diluent is contacted with said barium chloride having said uranium chloride absorbed therein prior to said contacting with said elementary chlorine at a temperature lower than 580° C. until said chlorides of said fission products are at least partly discharged from said barium chloride.

10. A method as set forth in claim 9, wherein said inert diluent is argon, nitrogen, or hydrogen, and wherein said chlorine is diluted with carbon tetrachloride, argon, or nitrogen.

References Cited

UNITED STATES PATENTS

| 3,125,409 | 3/1964 | Tury | 23—337 |
| 3,165,376 | 1/1965 | Golliher | 23—337 |
| 3,178,258 | 4/1965 | Cathers et al. | 23—337 |

L. DEWAYNE RUTLEDGE, *Primary Examiner.*

BENJAMIN R. PADGETT, *Examiner.*

S. TRAUB, M. J. McGREAL, *Assistant Examiners.*